(12) United States Patent
Robinson

(10) Patent No.: US 6,178,985 B1
(45) Date of Patent: Jan. 30, 2001

(54) AUTOMATIC DRAIN SYSTEM

(75) Inventor: Larry P. Robinson, 64 Brookedge Rd., Depew, NY (US) 14043

(73) Assignees: Larry P. Robinson; Charlene B. Robinson, both of Depew, NY (US)

( * ) Notice: Under 35 U.S.C. 154(b), the term of this patent shall be extended for 0 days.

(21) Appl. No.: 09/333,069

(22) Filed: Jun. 14, 1999

(51) Int. Cl.[7] .................................................. F16K 24/04
(52) U.S. Cl. ......................................... 137/195; 137/415
(58) Field of Search ..................................... 137/195, 415

(56) References Cited

U.S. PATENT DOCUMENTS 3,635,238 * 1/1972 Hankison .............................. 137/195
5,417,237 * 5/1995 Stumphauzer et al. ............... 137/195
5,687,754 * 11/1997 Nemeth et al. ................... 137/195 X

* cited by examiner

*Primary Examiner*—Gerald A. Michalsky
(74) *Attorney, Agent, or Firm*—Arthur S. Cookfair; James J. Ralabate

(57) ABSTRACT

An automatic drain system for removal of condensate from compressed air systems comprises a reservoir having an inlet for entry of condensate and outlet for the periodic discharge of accumulated condensate. The discharge, through a ball valve in the outlet, is controlled by a float structure responsive to the level of accumulated liquid condensate in the reservoir. An air discharge tube is provided for the exiting of air when the float (and liquid level) is at the highest position. The air discharge tube is in fluid communication with an air cylinder outside of the reservoir. The air cylinder is coupled to the ball valve to open the valve and allow liquid condensate to exit in response to air pressure transmitted from the air discharge tube. As the liquid exits the liquid level and float are lowered. When float is at its lower position, the float structure closes across the air discharge tube and the cycle repeats.

4 Claims, 5 Drawing Sheets

AUTOMATIC DRAIN SYSTEM

BACKGROUND OF THE INVENTION

1. Field of the invention

This invention relates to an automatic drain system and apparatus particularly designed for the removal of condensate and contaminants from compressed air systems.

2. Prior Art and Background of the Invention

In compressed air systems it is generally necessary to remove condensate as well as particulate material such as rust and scale to ensure proper operation and avoid corrosion and damage to the systems. To accomplish the removal of condensate various float valve assemblies and systems have been developed and used.

U.S. Pat. No. 3,635,238 to Hankinson et al. discloses an automatic valving device utilizing a dual float control system that can be used to drain condensate from compressed air systems.

Various patents to Cummings or Cummings et al disclose various automatic drain valves and systems for discharging condensate and foreign materials from various pneumatic systems and devices. Such valves and systems are described in U.S. Pat. Nos. 4,444,217; 4,562,855; 4,574,829; 4,779,640; 5,004,004; and 5,014,735.

U.S. Pat. No. 5,080,126 to DeRycke et al. discloses a magnet and float controlled valve to discharge moisture in a compressed air system.

U.S. Pat. No. 5,533,545 to Robinson discloses a drain system utilizing a magnet and float controlled drain system wherein condensate and particulate contaminants are automatically collected and discharged through an air pressure controlled ball valve.

Although the prior art discloses a number of devices and systems for removing moisture from compressed air systems, it will be appreciated that a need exists for a still further improved and efficient system for this purpose.

SUMMARY OF THE INVENTION

It is therefore an object of this invention to provide an improved drain system for the removal of condensate and particulate contaminants from compressed air systems.

It is another object of this invention to provide a drain system having improved efficiency and characterized by simplicity of design and requiring a minimum of parts.

It is a still further object to provide a drain system and apparatus that is compact in design.

These and other objects are accomplished in accordance with the present invention which provides an automatic drain system particularly adapted for removal of condensate and particulate contaminants from compressed air systems which comprises, in combination, a reservoir having a liquid inlet and a liquid outlet; a float structure comprising a float having a lever arm pivotally attached thereto at a fulcrum point of the lever arm and responsive to the liquid level in the reservoir; an air discharge tube controllably coupled to the lever arm of the float structure for opening and closing the air discharge tube in response to changes in the liquid level in the reservoir; an air cylinder in fluid communication with the air discharge tube; a valve for opening and closing the liquid outlet, the valve being responsively connected to the air cylinder so that the valve is controllably opened and closed by the air cylinder in response to air pressure transmitted from the reservoir through the air discharge tube to the air cylinder in response to changes in liquid level in the reservoir. Preferably, the movement of the lever arm is aided by use of a counter-weight attached thereto at the end opposite the float.

In operation, the liquid inlet of the reservoir is connected to a compressed air system to be drained so that condensate will flow by gravity into the reservoir. A vent port located at the top of the reservoir and also connected to the compressed air system allows the air to escape as the condensate enters. This allows air pressure to equalize and prevents air lock problems. When the float is at its lowest level a seal on the underside of the lever arm rests on the opening (seat) of the air discharge tube and effectively acts as a valve closing the air discharge tube. The lever arm is pivotally connected to the entrance end of the air discharge tube at the side opposite the float. As the condensate fills the reservoir, the float rises, lifting the seal from the seat of the air discharge tube and allowing air to flow through to an air cylinder attached to the outside of the reservoir. As the compressed air enters the cylinder a rod at the other end of the cylinder is forced outward. As the rod moves outward, it forces the ball valve open. As the ball valve opens, the pressure within the reservoir forces the liquid condensate, as well as particulate contaminants, through the passage in the ball valve and out the liquid outlet. As this happens, the liquid level in the reservoir drops and the float lowers. Finally, the float reaches its lowest position and the seal on the underside of the lever arm seals the air discharge tube, thus allowing the cycle to begin again. The excess air pressure that remains in the discharge tube and air cylinder is allowed to escape through a bleed hole. A spring in the air cylinder returns the cylinder to its retracted state and thus the ball valve closes.

In a preferred embodiment, as the float rises in response to a rising liquid level in the reservoir, the lever arm and seal are held in place with the aid of a magnetic force preventing air flow through the air discharge tube until buoyant force on the float is sufficient to overcome the magnetic force. The magnetic force may be created, for example, by a magnet attached to the air discharge tube and a ferromagnetic component integral with lever arms. This allows a greater volume of condensate to collect in the reservoir before the drain part of the cycle begins. Furthermore, when the force of buoyancy is great enough to overcome the magnetic force the seal will be fully lifted instantaneously from the seat and deliver a full flow of air, more than will dissipate through the bleed hole while the ball valve is quickly opened via the extension rod of the air cylinder.

In another preferred embodiment, a weight is attached to the end of the lever arm opposite the float.

In yet another preferred embodiment, two lever arms are employed. Both are pivotally connected to the entrance end of the air discharge tube. The weight is attached to one end of the first lever arm and a seal is attached to the underside of the arm in alignment above the entrance to the air discharge tube. A float is attached to the end of the second lever arm, and is positioned in alignment below the end of the first lever arm. At a point near the float, the second lever arm is tethered, for example, by means of a flexible wire, chain, rope or the like, to the end of the first lever arm that is opposite the end where the weight is attached. The purpose of the second lever arm with float, tethered to the first, is to create a delay in the closing of the air discharge tube as the float lowers. The delay will allow the expulsion of more condensate per cycle.

BRIEF DESCRIPTION OF THE DRAWINGS

The present invention and the manner in which it may be practiced is further illustrated with reference to the accompanying drawings wherein.

Figure 1:
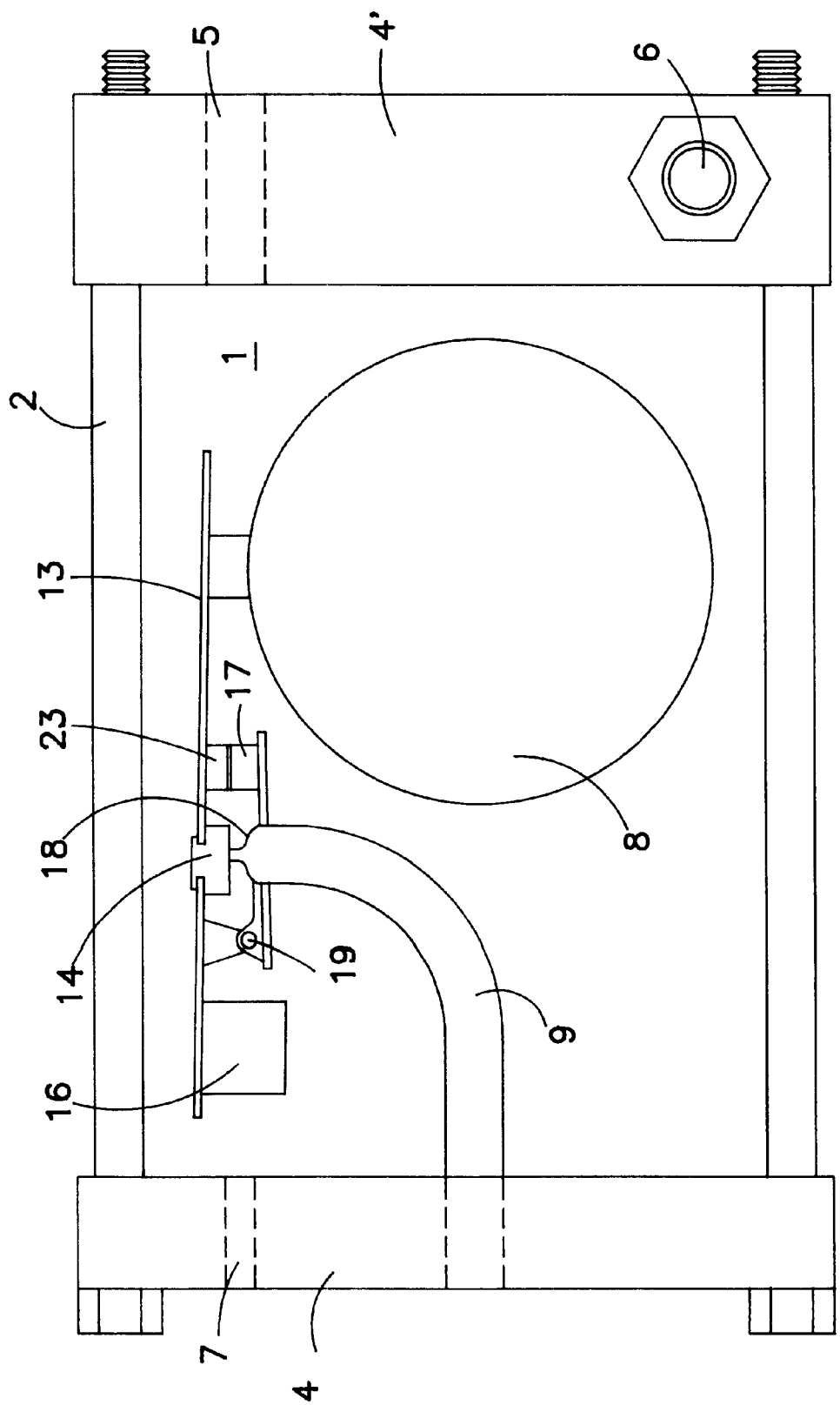
FIG. 1 is a side plan view of the interior of an embodiment of the automatic drain apparatus of this invention when the components are in the closed position.

DETAILED DESCRIPTION OF THE DRAWINGS AND THE PREFERRED EMBODIMENTS OF THE INVENTION

With particular reference to the drawings, the automatic drain apparatus of the invention includes a reservoir 1 contained within a housing comprising a housing wall 3 positioned between two blocks 4 (FIG. 5) and held tightly in place by bolts 2. A liquid inlet 5 allows condensate from a compressed air system to enter the reservoir for accumulation there and eventual elimination. Housing wall 3 is preferably made of a transparent or translucent material such as a polyacrylate or a polycarbonate or preferably, a fiberglass composite, so that the user can easily see how much condensate has accumulated at any time. The blocks 4 may be of various suitable materials, such as, aluminum, steel, plastic, or the like. Furthermore, although the preferred shape of the housing wall 3 is cylindrical, as shown, it will be apparent that in place of cylinder 3 there may be employed a housing wall of different cross-sectional shape, such as rectangular. A liquid outlet 6 is located at the lower portion of the reservoir. Both the liquid inlet 5 and the liquid outlet 6 open into the reservoir 1 and are in fluid communication therewith and can be located at any convenient location in the apparatus. In one embodiment the reservoir may have two or more liquid inlets so that the most appropriate inlet location may selected for convenience for a particular installation. The unused inlet(s) may simply remain capped or plugged.

Compressed air is allowed to enter the reservoir through liquid inlet 5 which is in fluid communication with the compressed air system being drained. A vent port 7 is located near the top of the reservoir and is in fluid communication with the compressed air system. As the liquid condensate enters the reservoir through liquid inlet 5, to gradually fill the reservoir, air can escape through vent port 7, thus preventing the occurrence of an air lock.

Figure 2:
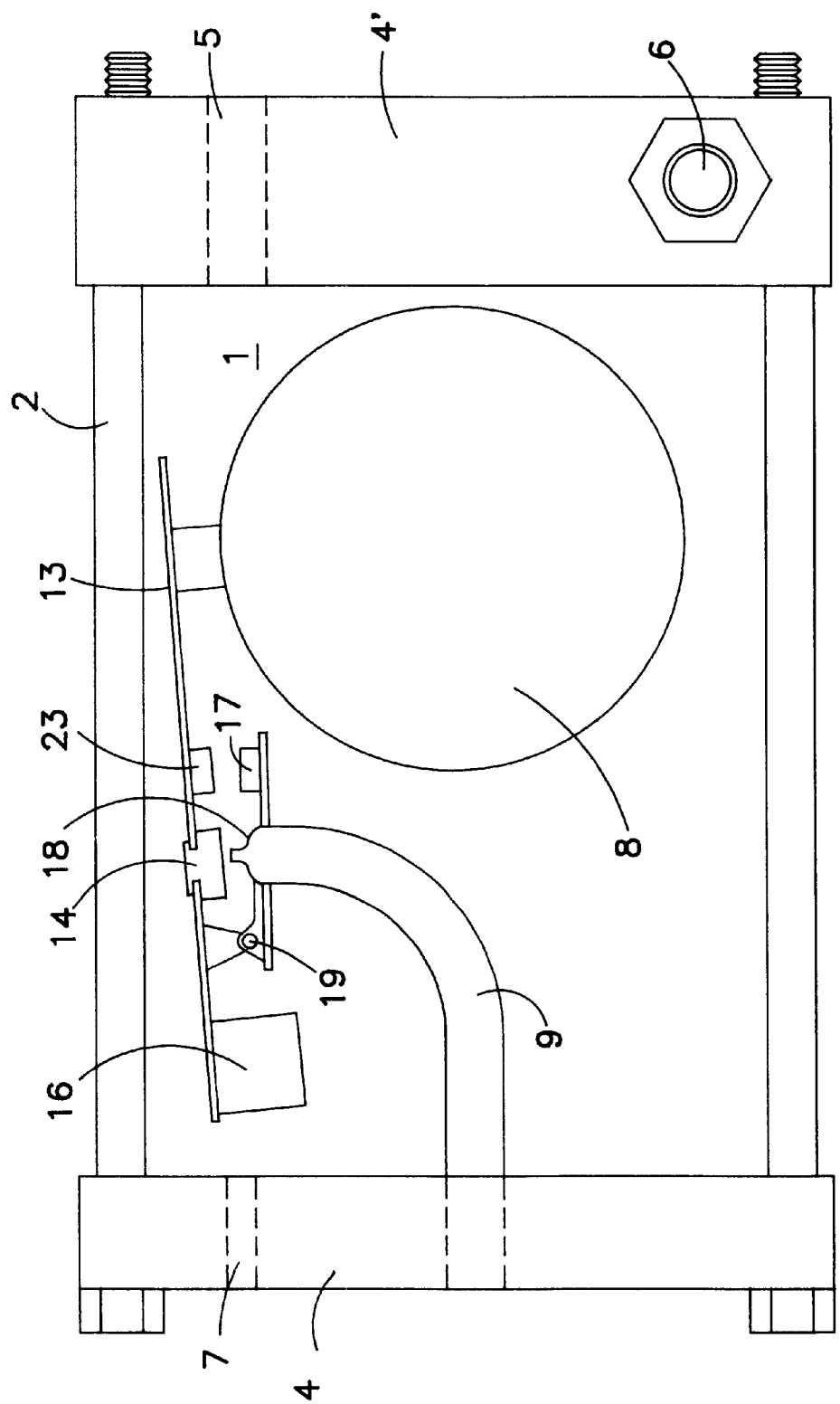
FIG. 2 is a side plan view of the interior of the embodiment shown in FIG. 1 of the automatic drain apparatus of this invention when the components are in the open position.
Figure 5:
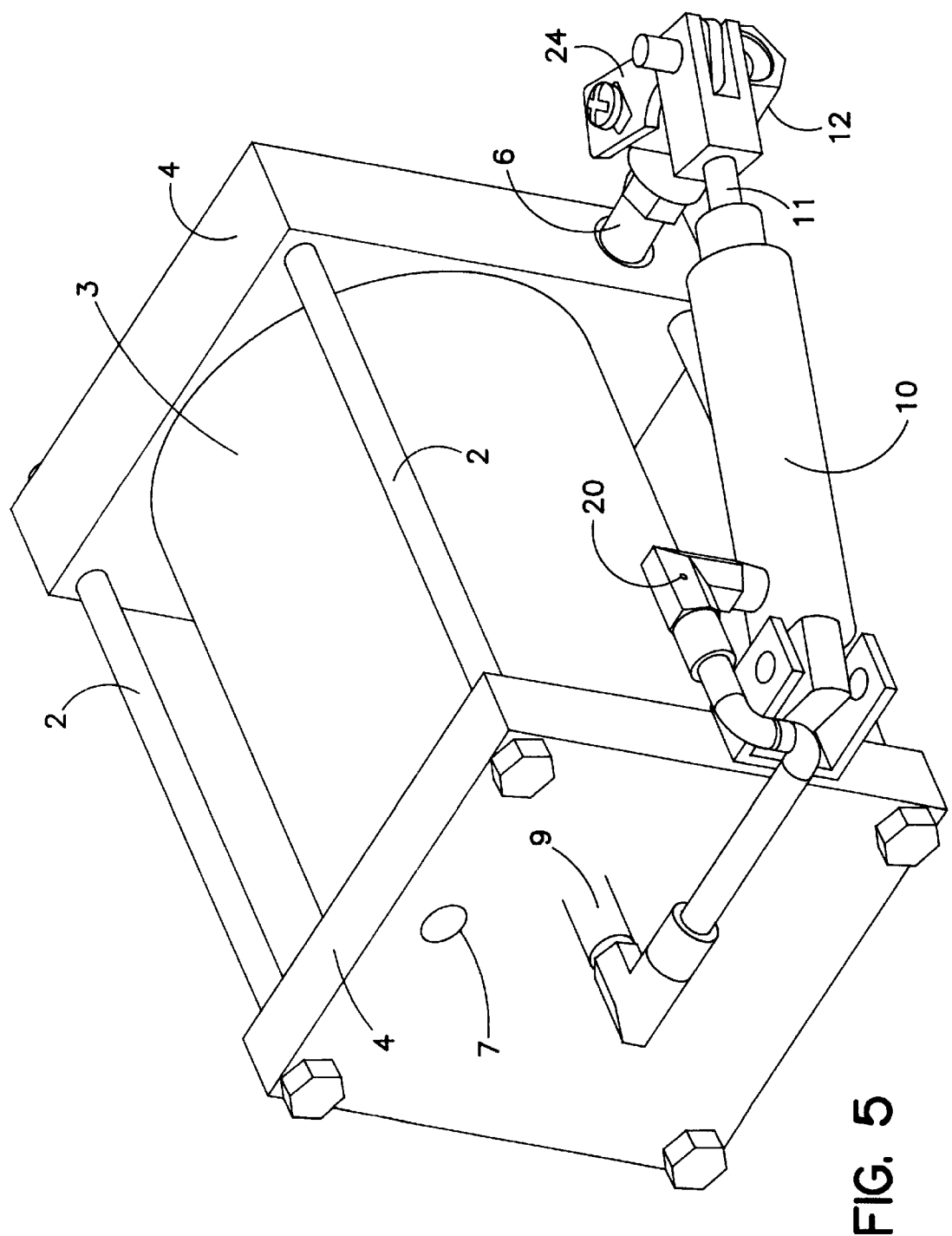
FIG. 5 is a side perspective of the exterior view of the automatic drain apparatus of this invention.

As will be seen from FIGS. 1 and 2, the flow of condensate out of the reservoir is controlled by a float structure comprising a float 8 having a lever arm 13 attached thereto. An air discharge tube 9, within the reservoir, is in fluid communication with an air cylinder 10 outside of the reservoir (FIG. 5). The air cylinder 10 contains a piston with extension rod 11 attached. The piston and extension rod are kept in a closed position by a spring within the cylinder. Extension rod 11 is attached by means of lever 24 to a ball valve 12 that controls the flow through liquid outlet 6. As the reservoir fills with condensate, the float rises. The lever arm 13 is pivotally attached to a pivot rod 19 near the entrance 18 to air discharge tube 9.

When float 8 is in its lowest position (FIG. 1), seal 14 on the underside of lever arm 13 rests on entrance 18 of air discharge tube 9, preventing the exiting of air therethrough. Seal 14 may be a resilient material, such as rubber, plastic, or the like. As the float rises, optionally aided by counterbalanced weight 16, seal 14 is lifted from entrance 18 of air discharge tube 9 (FIG. 2). Compressed air from the reservoir then exits through the air discharge tube 9 to air cylinder 10 (FIG. 5) causing extension rod 11 to extend and, in turn, to open ball valve 12. The air pressure within the reservoir 1 then forces the liquid condensate as well as particulate contaminants through the liquid outlet 6 where it may be passed to a collection site (not shown) for disposal. As the liquid level in the reservoir 1 drops, float 8 is lowered and lever arm 13 pivots downwardly until seal 14 rests on entrance 18 of air discharge tube 9, stopping the flow of compressed air to air cylinder 10. At this point the compressed air trapped in air cylinder 10 bleeds off through bleedhole 15 and the spring within the cylinder is allowed to return the extension rod to its normal retracted position, causing ball valve 12 to close.

The liquid condensate then begins to fill the reservoir; float 8 rises and the cycle repeats.

In a preferred embodiment, the closure of air discharge tube 9 may be aided with the use of one or more magnets. For example, a magnet 17 may be attached to the side of entrance 18 opposite pivot rod 19. Lever arm 13 is made a ferromagnetic material, such as, iron or nickel or, if the lever arm is made of a non-magnetic material, a piece of ferromagnetic material 23 may be attached to the lever arm in alignment with magnet 17. Alternatively, the attachments may be reversed, that is with the ferromagnetic material attached to the side of entrance 18 and the magnet attached to the underside of lever arm 13. Furthermore, in place of the ferromagnetic material there may be employed a second magnet with the poles of the magnets appropriately oriented. The use of magnet(s) in this manner affords a more secure closure of air discharge tube 9 while the reservoir is filling. More importantly, the magnet will hold the lever arm and seal in place until float 8 has sufficient buoyant force to overcome the magnetic force. When this occurs, the buoyancy of the float and the leverage exerted by weight 16 that is attached at the other end of lever arm 13 will allow seal 14 to be instantaneously lifted fully from entrance 18 and deliver the full flow of air required to open ball valve 12 via air cylinder 10 and extension rod 11 in sufficient excess of the amount that will be lost through bleedhole 20.

Figure 3:
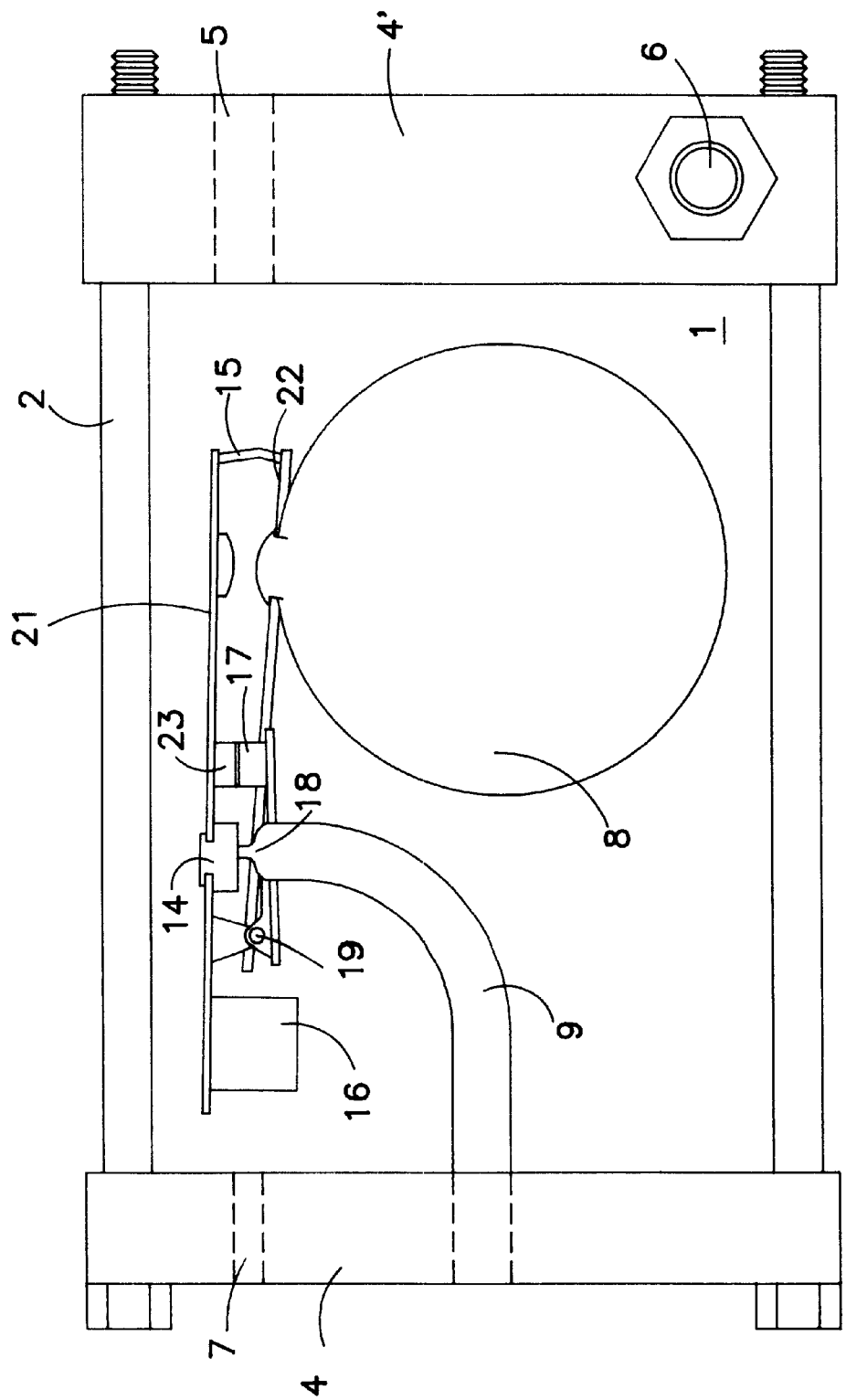
FIG. 3 is a side plan view of the interior of an alternate embodiment of the automatic drain apparatus of this invention when the components are in the closed position.
Figure 4:
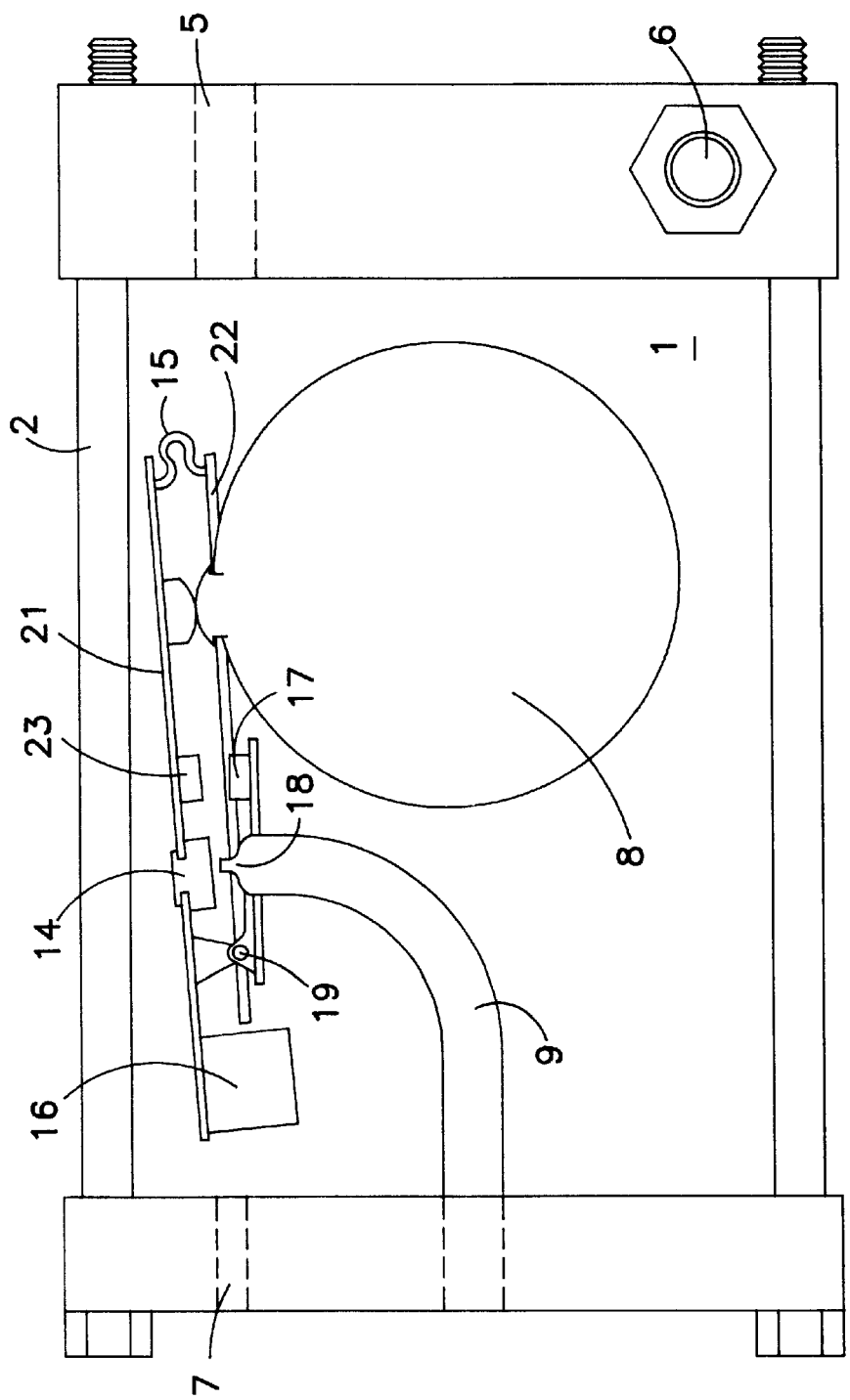
FIG. 4 is a side plan view of the interior of the alternate embodiment shown in FIG. 3 of the automatic drain apparatus of this invention with the components in the open position.

In a preferred embodiment, as depicted in FIGS. 3 and 4, two lever arms are employed. Float 8 is attached to a first lever arm 22. Weight 16 is attached to an opposite end of a second lever arm 21 and seal 14 is attached to the underside of the second lever arm 21 at a position in alignment above the entrance 18 of air discharge tube 9. Both lever arms are pivotally connected to pivot rod 19 at the side of entrance 18. The second lever arm 21 is flexibly connected by tether 15 to the first lever arm 22, resulting in a delay in the closing of seal 14 on entrance 18 as the condensate exits and float 8 is lowered. This delay will allow more condensate to be expelled during each cycle. When float 8 is at its lowest position and tether 15 is fully extended second lever arm 21 will pivot downwardly causing seal 14 to close entrance 18. The closure may be aided by the attractive force between magnet 17 and ferromagnetic material 23 in the manner described hereinabove regarding the embodiment of FIGS. 1 and 2. With entrance 18 closed, liquid condensate, entering through liquid inlet 5, will begin to fill the reservoir, causing float 8 to rise until it's bouyant force is sufficient to push second lever arm 21 pivotally upward, opening entrance 18. Air pressure is then transmitted through air discharge tube 9, to air cylinder 10 causing ball valve 12 to open and the liquid condensate in the reservoir to discharge through liquid outlet 6. With the lowering of the liquid level in reservoir 1, the float lowers and the cycle continues.

The apparatus of the invention has been described and illustrated with respect to a preferred embodiment wherein the internal mechanism is contained within a horizontally oriented cylinder. However, if desired, depending on space considerations for installation, the mechanism could be installed in a vertically oriented cylinder.

Although the invention has been described with reference to certain preferred embodiments, it will be appreciated by those skilled in the art that modifications and variations may be made without departing from the spirit and scope of the invention as defined by the appended claims.

What is claimed is:

1. An automatic drain system for removal of condensate and particulate contaminants from compressed air systems which comprises, in combination:

a reservoir having a liquid inlet and a liquid outlet;

an air discharge tube for discharging air from said reservoir;

a first lever arm, having a float attached thereto, said float being responsive to a liquid level in the reservoir and said first lever arm being pivotally connected to a pivot rod;

a second lever arm having a weight attached at one end thereof, an opposite end thereof being aligned over said float, said second lever arm being pivotally attached to a pivot rod so that as said liquid level rises and said float is buoyed upwardly, said opposite end is raised and said weight is lowered;

a seal attached to said second lever arm in alignment with an entrance of said air discharge tube so that when said weight is lowered, said seal is raised from said entrance permitting air flow therethrough;

a tether connecting said first lever arm and said second lever arm so that as said liquid level lowers and said float lowers, said tether is stretched and said opposite end of said second lever arm is pivotally lowered and said seal is lowered onto said entrance, preventing air flow therethrough;

an air cylinder in fluid communication with said air discharge tube;

a valve for opening and closing said liquid outlet, responsively connected to said air cylinder, said valve being controllably opened and closed in response to pressure from air exiting through said air discharge tube to said air cylinder in response to changes in the liquid level in the reservoir.

2. An automatic drain system according to claim 1 wherein as said float rises in response to a rising liquid level in the reservoir, said second lever arm and attached seal are held in place, with the aid of a magnetic force, preventing air flow through said air discharge tube, until bouyant force on said float is sufficient to overcome the attractive magnetic force.

3. An automatic drain system according to claim 2 wherein said magnetic force is created by a magnet attached to said air discharge tube and a ferromagnetic component integral with said second lever arm.

4. An automatic drain valve for removing condensate from compressed air systems comprising:

a reservoir housed in a transparent or translucent housing for accumulating condensate from a compressed air system, said reservoir having a liquid inlet the entry of liquid condensate and a liquid outlet for the discharge of accumulated condensate;

an air discharge tube having an entrance within the reservoir;

a first lever arm and a second lever arm within said reservoir, each pivotally mounted on a fixed pivot means said first lever arm having a float attached thereto, said float being responsive to a liquid level in the reservoir, said second lever arm having a weight attached to one end thereof, an opposite end of said second lever arm being aligned over said float so that as said liquid level rises, said float is buoyed upwardly raising said opposite end of said second lever arm;

a seal means attached to said second lever arm and positioned in alignment with said entrance to said air discharge tube so that as said opposite end of said second arm is in a lowest position, said seal rests upon said entrance, preventing a flow of air therethrough, and when said opposite end is at a highest level, said seal has been lifted from said entrance, allowing the flow of air therethrough;

a tether connecting said first lever arm and said second lever arm so that as said liquid level lowers and said float lowers, said tether is stretched and said opposite end of said second lever arm is pivotally lowered and said second seal is lowered onto said entrance, preventing air flow therethrough;

a magnet means providing an attractive magnetic force between said float lever arm and said entrance to the air discharge tube holding said seal on said entrance, preventing air flow through said air discharge tube, until a bouyant force on said float is sufficient to overcome said attractive magnetic force;

an air cylinder mounted on the outside of said housing and in fluid communication with said air discharge tube;

a valve for opening and closing said liquid outlet, said valve being responsively connected to said air cylinder and controllably opened and closed in response to pressure from air exiting through said air discharge tube to said air cylinder in response to changes in the liquid level in the reservoir.

* * * * *